UNITED STATES PATENT OFFICE.

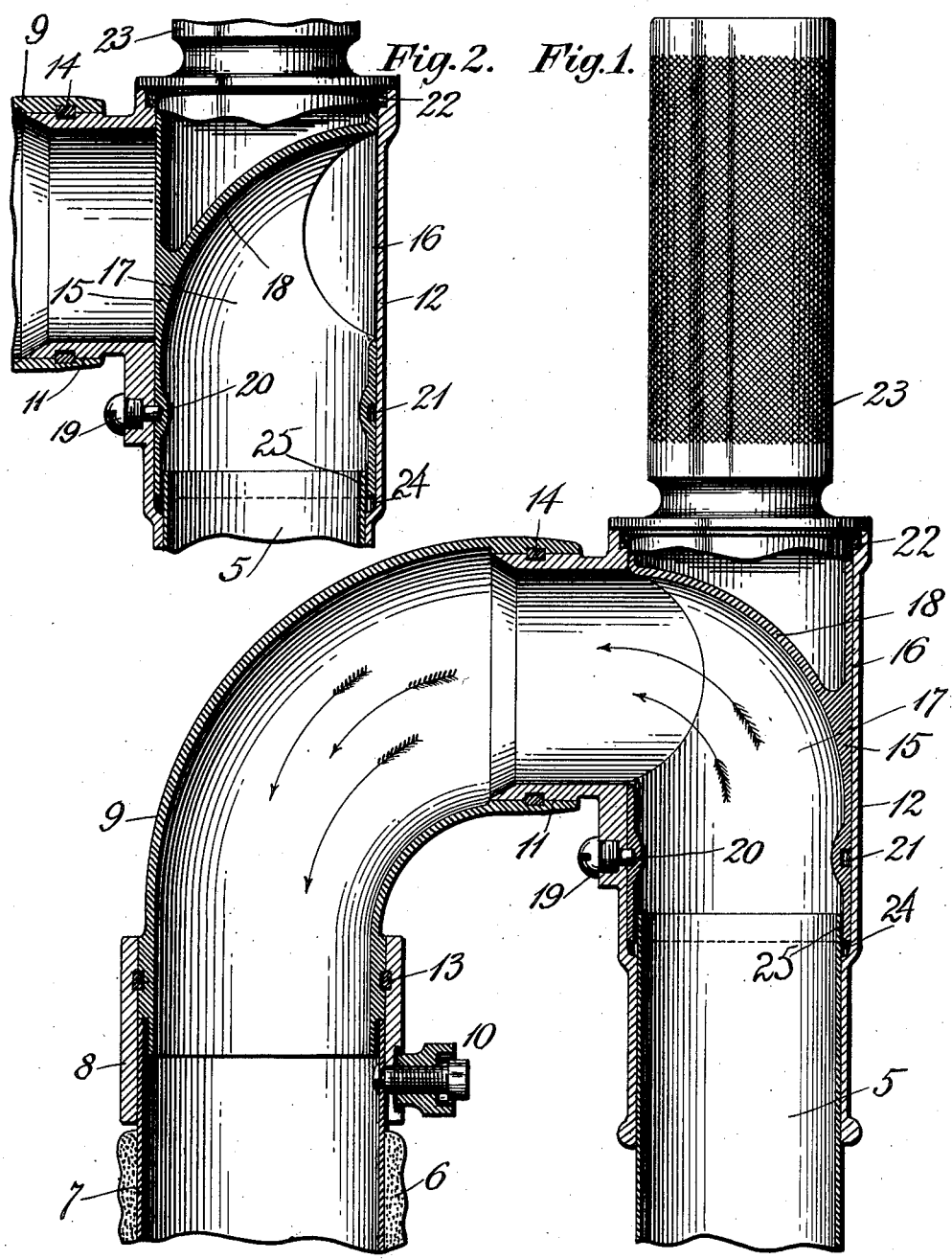

IRA H. SPENCER, OF HARTFORD, CONNECTICUT, ASSIGNOR TO THE SPENCER TURBINE CLEANER COMPANY, OF HARTFORD, CONNECTICUT, A CORPORATION OF CONNECTICUT.

VALVE FOR CLEANING-TOOLS.

1,103,547.

Specification of Letters Patent.

Patented July 14, 1914.

Application filed April 8, 1908. Serial No. 425,964.

*To all whom it may concern:*

Be it known that I, IRA H. SPENCER, a citizen of the United States, and a resident of Hartford, in the county of Hartford and State of Connecticut, have invented a new and Improved Valve for Cleaning-Tools, of which the following is a specification.

The invention relates to the class of devices herein set out, and the object of this invention is to provide a device of this class having numerous novel features of advantage and utility. A form of device in the use of which these objects may be attained is illustrated in the accompanying drawings, in which—

Figure 1 is a view partially in central longitudinal section of the handle of a cleaning tool embodying my invention, the valve being shown as open to permit passage of fluid therethrough. Fig. 2 is a like view of a portion of the device shown in Fig. 1, but showing the valve closed.

In the accompanying drawings the numeral 5 denotes the end of the handle of a cleaning tool designed for use in connection with a current of fluid which is passed through the tool, preferably in the direction of the arrows shown in Fig. 1, this current of fluid serving to remove dirt and the like.

The numeral 6 denotes a hose or like tubing, which is connected with an apparatus for creating the current of air, the end of this hose having a nipple 7 engaging a coupling 8 on the end of an elbow 9, a fastening device 10 being employed to secure the nipple to the elbow. The elbow is pivoted to an extension 11 from the valve body 12, the latter being secured to the end of the handle 5. The coupling 8 may have a turning movement on the elbow, a ring 13 holding the parts from disengagement, and the elbow also has a free rotary movement on the projection 11, a ring 14 keeping the parts in engagement.

The valve body or casing is formed to provide a suitable end for the handle 5 and a valve 15 is located within the casing. This valve is generally of cylindrical form to fit the cylindrical valve chamber 16 within the casing, and a passage 17 extends through the valve enabling a communication to be established between the opening through the handle 5 and the tube or hose 6. The passage 17 is curved, as clearly shown in the figures, a wall 18 defining one side of the curved portion of the passage. The valve 15 is rotatably held within its chamber as by means of a screw stud 19, the end 20 of which engages within a groove 21 in the valve. A packing 22 is employed to prevent leaking of fluid into the valve at the joint at the upper end of the valve shell. A handle 23 is secured to or forms an integral part of the valve, this handle being located in a line in extension of the tool handle 5 and thus serving not only as a convenient means for operating the tool, but it also serves as a means whereby the valve may be turned at any time to control the flow of fluid through the handle.

In order to prevent the presence of dust between the valve body 12 and the valve 15 the handle 5 is extended within the valve to form a lip 25, as shown in Fig. 1 of the drawings, one of the parts being offset to allow the location of the end of the valve behind the handle 5. In the form shown the valve body is offset or enlarged, providing an opening 24 located between the valve casing and the end of the handle 5 within which the end of the valve is located. This lapping of the joint between the handle and valve effectually prevents any entry of dust behind the valve and the unsatisfactory working of the valve from such cause.

I claim—

1. A tool handle formed for passage of a fluid therethrough, a valve casing located at the outer free end of the handle, means for connection of a tube to said casing, a valve located within said casing, and valve controlling means projecting at the end of said casing with its axis in line with the axis of the handle.

2. A tool handle arranged for a flow of fluid therethrough, a valve casing secured to and forming the outer free end of the handle and having a cylindrical valve chamber, means for attachment of a hose to said casing, a cylindrical valve located within said casing and having a fluid passage, and a handle secured to the valve and with its axis in line with the axis of the tool handle.

3. A tool handle arranged for flow of fluid therethrough and having a valve casing terminating the outer free end of the handle, a lateral projection for the attachment of a hose or like part to the side of said casing, a valve located within the casing and having a fluid passage, and operating means connected with the valve and projecting at the end of said casing.

4. A handle arranged for flow of fluid therethrough and having a valve casing terminating the outer free end of the handle with a cylindrical chamber in said casing, a cylindrical valve located within said chamber, a lateral extension for attachment of a hose or like part, and a handle secured to said valve and with its axis coincident with the axis of said handle.

5. A handle having a valve casing at its end, an extension from said casing, a discharge elbow pivoted to the extension, a valve located within the valve casing and having a fluid passage, and means secured to the valve and located at the end of the casing for operating the valve.

6. A tool handle arranged for flow of fluid therethrough, a valve casing terminating the outer free end of the handle and having a cylindrical valve chamber, a lateral projection from said casing, an elbow pivoted to said projection, a cylindrical valve located within said chamber and having a fluid passage, and a handle secured to said valve and projecting in line with the tool handle and serving as a means for operating the valve.

7. A tubular handle, a valve casing fitting over the outer free end of said handle and constituting the end thereof, a cylindrical valve located within said casing beyond the end of the handle, a connection to said casing for the passage of fluid to said valve, and a handle with its axis located in line with the axis of said valve and projecting beyond the outer end of said casing.

8. A tubular handle arranged for passage of fluid therethrough, a cap for the outer free end of said handle, said cap being formed into a valve casing, an extension from the side of said cap beyond the free end of the handle, means for attachment of a hose or the like to said extension, a valve located within said cap and having a passage for fluid therethrough, and a handle projecting beyond the end of the cap and rigidly connected with the valve, the axis of said handle being located in line with the axis of said valve.

9. A tool handle formed for passage of fluid therethrough, a valve casing located at the outer end of the handle, means for connection of a tube to said casing, a valve located within said casing, and valve operating means projecting from the valve at the end of the handle and forming a handle for the manipulation of said tool.

10. A tool handle formed for passage of fluid therethrough, a valve casing located at the outer end of the handle and having a shoulder on its interior for the reception of a packing, means for connection of a tube to said casing, a valve located within said casing and having a flange overlying said packing and the end of the casing, and a handle projecting from the end of the valve beyond said flange.

IRA H. SPENCER.

Witnesses:
REGINALD BIRNEY,
E. J. HEALY.